(12) United States Patent
Toyoshima et al.

(10) Patent No.: US 7,875,341 B2
(45) Date of Patent: *Jan. 25, 2011

(54) ANTIREFLECTIVE FILM, POLARIZER PLATE AND DISPLAY

(75) Inventors: Tetsuya Toyoshima, Tokyo (JP); Kouhei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/667,274

(22) PCT Filed: Nov. 8, 2005

(86) PCT No.: PCT/JP2005/020456
§ 371 (c)(1),
(2), (4) Date: Aug. 7, 2007

(87) PCT Pub. No.: WO2006/051784
PCT Pub. Date: May 18, 2006

(65) Prior Publication Data
US 2008/0032146 A1    Feb. 7, 2008

(30) Foreign Application Priority Data
Nov. 9, 2004   (JP) .......................... 2004-324543

(51) Int. Cl.
*B32B 7/02*    (2006.01)
*B32B 23/08*   (2006.01)
*B32B 27/30*   (2006.01)
*B32B 27/32*   (2006.01)
*B32B 27/36*   (2006.01)

(52) U.S. Cl. ...................... 428/212; 428/480; 428/483; 428/500; 428/507; 428/508; 428/509; 428/510; 428/515; 428/516; 428/520; 428/522; 428/523; 359/580; 359/586

(58) Field of Classification Search .................. None
See application file for complete search history.

(56) References Cited

U.S. PATENT DOCUMENTS 4,080,491 A * 3/1978 Kobayashi et al. .......... 526/137

(Continued)

FOREIGN PATENT DOCUMENTS

JP    6-255053 A    9/1994

(Continued)

OTHER PUBLICATIONS

European Search Report for Application No. 05802997.6, dated Feb. 26, 2010.

*Primary Examiner*—Vivian Chen
(74) *Attorney, Agent, or Firm*—Birch, Stewart, Kolasch & Birch, LLP

(57) ABSTRACT

The present invention provides an antireflective film including at least an antireflective layer and a base resin layer, the base resin layer including at least layers a and b respectively including a thermoplastic resin as a main component, the layer a having a flexural modulus higher than that of the layer b, and the layer a being closer to the antireflective layer than the layer b, a polarizer plate obtained by bonding the antireflective film to a polarizer, and a display including the polarizer plate. According to the present invention, an antireflective film in which an antireflective layer is stacked on a transparent resin substrate and exhibits excellent antireflective performance, tenacity, and surface hardness, a polarizer plate using the antireflective film, and a display including the polarizer plate are provided.

9 Claims, 3 Drawing Sheets

U.S. PATENT DOCUMENTS

| | | | |
|---|---|---|---|
| 6,224,976 B1 * | 5/2001 | Takushima et al. | 428/355 R |
| 6,329,047 B1 * | 12/2001 | Beer et al. | 428/215 |
| 6,391,400 B1 * | 5/2002 | Russell et al. | 428/34 |
| 6,444,298 B1 | 9/2002 | Tadokoro et al. | |
| 6,502,943 B2 * | 1/2003 | Nakamura et al. | 359/603 |
| 6,521,312 B1 * | 2/2003 | Keiser | 428/41.8 |
| 6,558,804 B2 * | 5/2003 | Sato et al. | 428/447 |
| 6,692,821 B2 * | 2/2004 | Koyama et al. | 428/213 |
| 6,713,170 B1 * | 3/2004 | Kaneko et al. | 428/323 |
| 7,179,529 B2 * | 2/2007 | Mizuno et al. | 428/354 |
| 7,405,008 B2 * | 7/2008 | Domine et al. | 428/516 |
| 7,479,327 B2 * | 1/2009 | Domine | 428/523 |
| 2002/0136853 A1 | 9/2002 | Koyama et al. | |
| 2002/0176973 A1 * | 11/2002 | Keiser | 428/212 |
| 2003/0054187 A1 * | 3/2003 | Higashi et al. | 428/520 |
| 2007/0285777 A1 * | 12/2007 | Toyoshima et al. | 359/485 |

FOREIGN PATENT DOCUMENTS

| | | |
|---|---|---|
| JP | 8-281882 A | 10/1996 |
| JP | 8-338912 A | 12/1996 |
| JP | 2000-206303 A | 7/2000 |
| JP | 2001-272535 A | 10/2001 |
| JP | 2001-322216 * | 11/2001 |
| JP | 2002-249600 A | 9/2002 |
| JP | 2002-286932 A | 10/2002 |
| JP | 2002-292808 A | 10/2002 |
| JP | 2002-303726 A | 10/2002 |
| JP | 2003-114302 A | 4/2003 |
| JP | 2003-161931 A | 6/2003 |
| JP | 2003-266607 A | 9/2003 |
| JP | 2003-344608 A | 12/2003 |
| JP | 2004-53801 A | 2/2004 |
| WO | WO-01/38248 A1 | 5/2001 |
| WO | WO-03/020656 A1 | 3/2003 |

* cited by examiner

ANTIREFLECTIVE FILM, POLARIZER PLATE AND DISPLAY

TECHNICAL FIELD

The present invention relates to an antireflective film exhibiting high tenacity and high surface hardness, a polarizer plate obtained by bonding the antireflective film to a polarizer, and a display including the polarizer plate.

BACKGROUND ART

A method has been widely known which produces a multilayer film by stacking resins to make the most of the properties of the respective resins.

For example, JP-A-6-255053 discloses a forming thermoplastic resin sheet having at least two layers in which at least one layer is an amorphous polyolefin, and a formed product of the thermoplastic resin sheet. JP-A-6-255053 describes that the thermoplastic resin sheet exhibits excellent steam barrier properties and transparency, does not exhibit thermal adhesion to a die, and can be molded over a wide temperature range.

JP-A-8-281882 discloses a polystyrene film formed of a laminate of a polystyrene layer/acrylonitrile-butadiene-styrene copolymer layer/polystyrene layer. JP-A-8-281882 describes that this stacked film is inexpensive, exhibits excellent transparency and impact resistance, and shows a well-balanced tear strength in the longitudinal direction or the lateral direction.

Technology has also been known which uses a multilayer film as a polarizer plate protective film. For example, JP-A-2000-206303 discloses a polarizer plate protective film formed by stacking a resin layer having a positive photoelastic constant and a resin layer having a negative photoelastic constant, each having a degree of hygroscopic lower than that of triacetyl cellulose, and having a photoelastic constant smaller than a specific value. JP-A-2000-206303 describes that this polarizer plate protective film does not cause display nonuniformity and a decrease in contrast even when allowed to stand at a high temperature and a high humidity.

JP-A-2002-249600 discloses a norbornene resin film having a UV transmittance at a wavelength of 380 nm or less of 40% or less and formed of a three-layer laminate in which a surface layer is stacked on each side of an intermediate layer, wherein at least the intermediate layer contains a UV absorber, and the UV absorber concentration of the intermediate layer is set to be higher than that of the surface layer. JP-A-2002-249600 describes that this resin film does not cause defective appearance due to volatilization of the UV absorber during extrusion molding.

An antireflective film in which an antireflective layer is stacked on a transparent resin base has been used as a surface antireflective film for flat panel displays such as a liquid crystal display, a plasma display, and an organic electroluminescent display. Such an antireflective film is required to exhibit excellent tenacity and surface hardness in addition to excellent antireflection performance.

However, an antireflective film exhibiting excellent tenacity and surface hardness cannot be obtained by using the multilayer films disclosed in the above patent documents. Therefore, further improvements have been demanded.

The present invention has been achieved in view of the above-described situation of the related art. An object of the present invention is to provide an antireflective film in which an antireflective layer is stacked on a transparent resin base and exhibits excellent antireflection performance, tenacity, and surface hardness, a polarizer plate using the antireflective film, and a display including the polarizer plate.

DISCLOSURE OF THE INVENTION

The inventors of the present invention have conducted extensive studies on an antireflective film in which an antireflective layer is stacked on a base resin film in order to achieve the above object. As a result, the inventors have found that an antireflective film exhibiting excellent antireflection performance, tenacity, and surface hardness can be obtained by forming an antireflective layer on a layer a of a transparent resin film formed by stacking a layer a including a thermoplastic resin with a relatively high flexural modulus and a layer b including a thermoplastic resin with a relatively low flexural modulus. This finding has led to the completion of the present invention.

According to a first aspect of the present invention, an antireflective film as defined in the following (1) to (7) is provided.

(1) An antireflective film comprising at least an antireflective layer and a base resin layer, the base resin layer including at least layers a and b respectively including a thermoplastic resin as a main component, the layer a having a flexural modulus higher than that of the layer b, and the layer a being closer to the antireflective layer than the layer b.

(2) The antireflective film according to (1), wherein the thermoplastic resin forming the layer a is a vinyl aromatic polymer, a polyacrylate polymer, a polymethacrylate polymer, a vinyl alicyclic hydrocarbon polymer, or a hydrogenated product thereof.

(3) The antireflective film according to (1) or (2), wherein the thermoplastic resin forming the layer b is an alicyclic structure-containing polymer, a cellulose polymer, or a polyester polymer.

(4) The antireflective film according to any one of (1) to (3), wherein a difference in flexural modulus between the layers a and b is 0.2 GPa to 2.5 GPa.

(5) The antireflective film according to any one of (1) to (4), wherein a combination (layer a/layer b) of the layers a and b is a vinyl aromatic polymer/alicyclic structure-containing polymer, a polyacrylate polymer/alicyclic structure-containing polymer, or a polymethacrylate polymer/alicyclic structure-containing polymer.

(6) The antireflective film according to any one of (1) to (5), wherein the antireflective layer includes a low-refractive-index layer with a refractive index of 1.40 or less.

(7) The antireflective film according to any one of (1) to (6), wherein the base resin layer is obtained by coextrusion.

According to a second aspect of the present invention, a polarizer plate as defined in (8) below is provided.

(8) A polarizer plate obtained by bonding the antireflective film of the present invention to a polarizer.

According to a third aspect of the present invention, a display as defined in (9) below is provided.

(9) A display comprising the polarizer plate of the present invention.

BEST MODE FOR CARRYING OUT THE INVENTION

Figure 1:
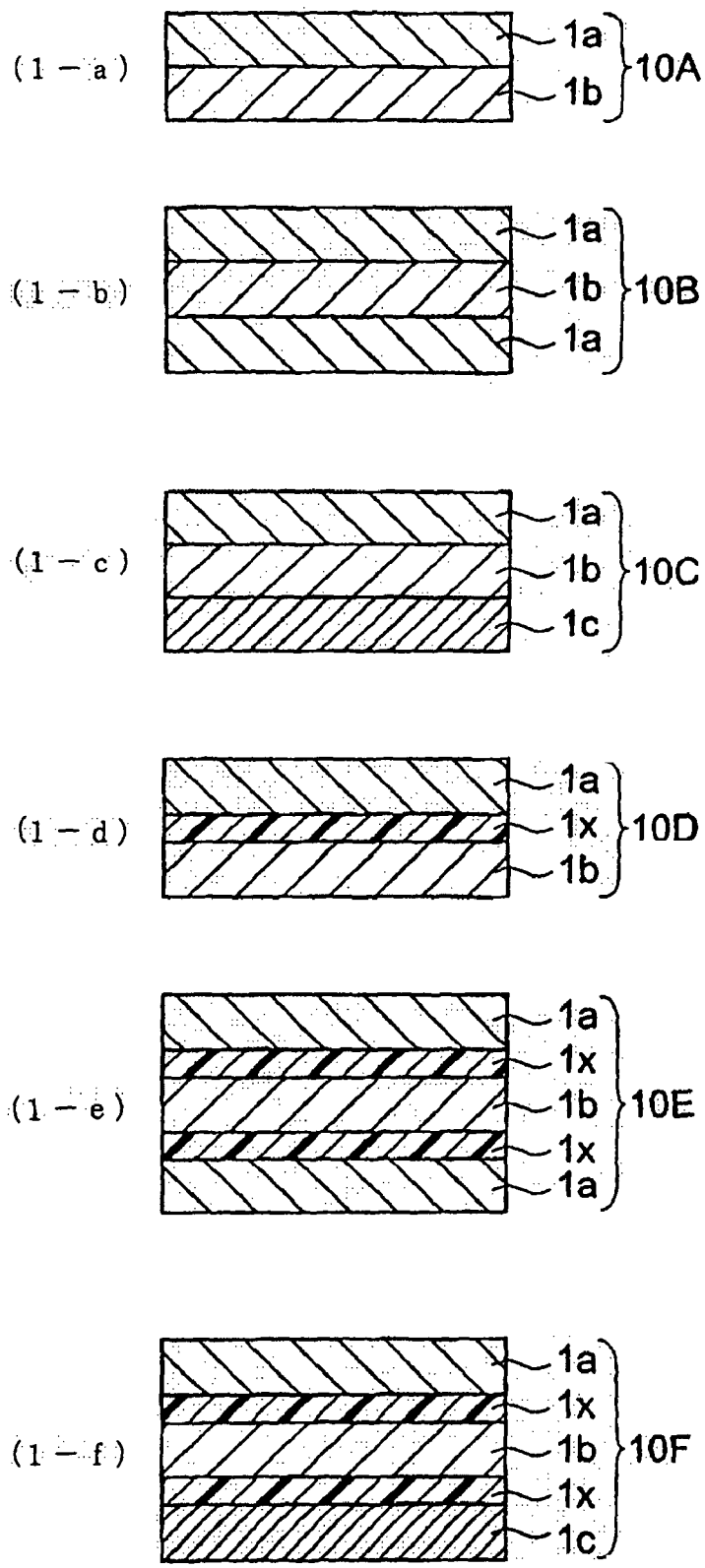
FIGS. 1-*a* to 1-*f* are views showing layer configuration examples of a base resin.

The present invention is described below in detail.

1) Antireflective Film

An antireflective film of the present invention includes at least an antireflective layer and a base resin layer, the base resin layer including at least layers a and b respectively including a thermoplastic resin as a main component, the layer a having a flexural modulus higher than that of the layer b, and the layer a being closer to the antireflective layer than the layer b.

(1) Base Resin Layer

The base resin layer of the antireflective film of the present invention includes at least the layers a and b respectively including a thermoplastic resin as the main component. The term "including a thermoplastic resin as the main component" means that a resin component forming each of the layers a and b is a thermoplastic resin, and the layers a and b may optionally include an additive and the like.

(i) Layer a

The thermoplastic resin included in the layer a is not particularly limited insofar as the thermoplastic resin exhibits high transparency. In particular, a thermoplastic resin having a light transmittance of 80% or more and a haze value of 0.5% or less is preferable.

As specific preferred examples of the thermoplastic resin included in the layer a, a vinyl aromatic polymer, a poly (meth)acrylate polymer, a polyacrylonitrile polymer, a vinyl alicyclic hydrocarbon polymer, a hydrogenated product thereof, and the like can be given. These thermoplastic resins may be used either individually or in combination of two or more. The term "(meth)acrylate" means acrylate and/or methacrylate.

As examples of the vinyl aromatic polymer, polystyrene; a copolymer of styrene and/or a styrene derivative and at least one compound selected from acrylonitrile, maleic anhydride, methyl methacrylate, and butadiene; a hydrogenated product of a copolymer of styrene and conjugated diene (including a hydrogenated product of an aromatic ring); and the like can be given. As examples of the styrene derivative, 4-methylstyrene, 3-methylstyrene, 4-chlorostyrene, 4-methoxystyrene, 4-tert-butoxystyrene, α-methylstyrene, and the like can be given.

As specific examples of the poly(meth)acrylate polymer, a homopolymer of a (meth)acrylate compound, a copolymer of two or more (meth)acrylate compounds, a copolymer of a (meth)acrylate compound and other copolymerizable monomers; and the like can be given. The term "(meth)acrylate" means acrylate or methacrylate.

As specific examples of the (meth)acrylate compound, methyl (meth)acrylate, ethyl(meth)acrylate, propyl(meth) acrylate, isopropyl(meth)acrylate, butyl(meth)acrylate, isobutyl(meth)acrylate, t-butyl(meth)acrylate, hexyl (meth) acrylate, 2-ethylhexyl(meth)acrylate, 2-hydroxyethyl(meth) acrylate, polyethylene glycol mono(meth)acrylate, and the like can be given.

As a specific examples of the polyacrylonitrile polymer, a homopolymer of acrylonitrile, a copolymer of acrylonitrile and a monomer copolymerizable with acrylonitrile, and the like can be given. As examples of the monomer copolymerizable with acrylonitrile, acrylic acid ester, methacrylic acid ester, styrene, vinyl acetate, glycidyl methacrylate, divinylbenzene, polyethylene glycol (n=1 to 9) dimethacrylate, and the like can be given.

The vinyl alicyclic hydrocarbon polymer is a polymer including a repeating unit derived from a vinylcycloalkane or vinylcycloalkene. As examples of the vinyl alicyclic hydrocarbon polymer, polymers of vinyl alicyclic hydrocarbon compounds such as a vinylcycloalkane such as vinylcyclohexane and a vinylcycloalkene such as vinylcyclohexene, and hydrogenated products thereof; aromatic-portion hydrogenated products of polymers of vinyl aromatic hydrocarbon compounds such as styrene and α-methylstyrene; and the like can be given.

The vinyl alicyclic hydrocarbon polymer may be a copolymer such as a random copolymer or a block copolymer of a vinyl alicyclic hydrocarbon compound or a vinyl aromatic hydrocarbon compound and a monomer copolymerizable with these monomers, or a hydrogenated product thereof. As examples of block copolymerization, diblock, triblock, or higher multiblock copolymerization, gradient block copolymerization, and the like can be given. Note that block copolymerization is not particularly limited.

As the resin for the layer a, the vinyl aromatic polymer, the poly(meth)acrylate polymer, the vinyl alicyclic hydrocarbon polymer, or the hydrogenated product thereof is preferable, with polystyrene, a styrene-maleic acid copolymer, polymethyl methacrylate, the vinyl alicyclic hydrocarbon polymer, or the hydrogenated product thereof being more preferable.

(ii) Layer b

The thermoplastic resin forming the layer b is not particularly limited insofar as the thermoplastic resin exhibits high transparency. In particular, a thermoplastic resin having a light transmittance of 80% or more and a haze value of 0.5% or less is preferable.

As specific preferred examples of the thermoplastic resin forming the layer b, an alicyclic structure-containing polymer, a cellulose polymer, a polyester polymer, a polycarbonate polymer, a polysulfone polymer, a polyethersulfone polymer, a vinyl aromatic polymer, a polyolefin polymer, a polyvinyl alcohol polymer, a polyvinyl chloride polymer, a poly(meth)acrylate polymer, and the like can be given. These resins may be used either individually or in combination of two or more.

Of these, the alicyclic structure-containing polymer; the cellulose polymer such as cellulose diacetate, cellulose triacetate, and cellulose acetate butyrate; the polyester polymer such as polyethylene terephthalate, polybutylene terephthalate, and polyethylene naphthalate are preferable due to excellent transparency and the like. It is more preferable to use the alicyclic structure-containing polymer, cellulose triacetate, or polyethylene terephthalate from the viewpoint of transparency, dimensional stability, and reduced weight, with the alicyclic structure-containing polymer being particularly preferable from the viewpoint of low hygroscopicity and dimensional stability.

The alicyclic structure-containing polymer includes an alicyclic structure in the repeating unit of the polymer. As the alicyclic structure-containing polymer, a polymer including an alicyclic structure in the main chain or a polymer including an alicyclic structure in the side chain may be used.

As examples of the alicyclic structure, a cycloalkane structure, a cycloalkene structure, and the like can be given. Of these, the cycloalkane structure is preferable from the viewpoint of thermal stability and the like. The number of carbon atoms forming the alicyclic structure is not particularly limited. The number of carbon atoms is usually 4 to 30, preferably 5 to 20, and still more preferably 5 to 15. If the number of carbon atoms forming the alicyclic structure is within the above range, a base resin film exhibiting excellent heat resistance and flexibility can be obtained.

The content of the repeating unit having the alicyclic structure in the alicyclic structure-containing polymer may be arbitrarily selected depending on the application. The content of the repeating unit having the alicyclic structure is usually 50 wt % or more, preferably 70 wt % or more, and still more preferably 90 wt % or more. If the content of the repeating unit having the alicyclic structure is too low, heat resistance may be decreased. A repeating unit in the alicyclic structure-containing polymer other than the repeating unit having the alicyclic structure is arbitrarily selected depending on the application.

As specific examples of the alicyclic structure-containing polymer, a norbornene polymer, a monocyclic olefin polymer, a cyclic conjugated diene polymer, a hydrogenated product thereof, and the like can be given. Of these, the norbornene polymer is preferable from the viewpoint of transparency and moldability.

As specific examples of the norbornene polymer, a ring-opening polymer of norbornene monomers, a ring-opening polymer of a norbornene monomer and a monomer which can undergo ring-opening copolymerization with the norbornene monomer, hydrogenated products of these copolymers, an addition polymer of norbornene monomers, an addition polymer of a norbornene monomer and a monomer which can undergo addition copolymerization with the norbornene monomer, and the like can be given. Of these, the hydrogenated product of the ring-opening (co)polymer of norbornene monomers is preferable from the viewpoint of transparency.

As examples of the norbornene monomer, bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]dec-3-ene (common name: methanotetrahydrofluorene), tetracyclo[4.4.0.1$^{2,5}$.1$^{7,10}$]dodec-3-ene (common name: tetracyclododecene), derivatives (derivative including a substituent on the ring, for example) of these compounds, and the like can be given. As examples of the substituent, an alkyl group, an alkylene group, an alkoxycarbonyl group, a carboxyl group, and the like can be given. The same or different substituents may be bonded to the ring in combination. The norbornene monomers may be used either individually or in combination of two or more.

As examples of the monomer which can undergo ring-opening copolymerization with the norbornene monomer, monocyclic olefins such as cyclohexene, cycloheptene, and cyclooctene, and derivatives thereof; cyclic conjugated dienes such as cyclohexadiene and cycloheptadiene, and derivatives thereof; and the like can be given.

The ring-opening polymer of the norbornene monomers and the ring-opening polymer of the norbornene monomer and the monomer copolymerizable with the norbornene monomer may be obtained by polymerizing the monomers in the presence of a ring-opening polymerization catalyst.

As the ring-opening polymerization catalyst, a known catalyst may be used.

As examples of the monomer which can undergo addition copolymerization with the norbornene monomer, α-olefins having 2 to 20 carbon atoms such as ethylene and propylene, and derivatives thereof; cycloolefins such as cyclobutene and cyclopentene, and derivatives thereof; nonconjugated dienes such as 1,4-hexadiene; and the like can be given. These monomers may be used either individually or in combination of two or more. Of these, the α-olefins are preferable, with ethylene being still more preferable.

The addition polymer of the norbornene monomers and the addition polymer of the norbornene monomer and the monomer which can undergo addition copolymerization with the norbornene monomer may be obtained by polymerizing the monomers in the presence of an addition polymerization catalyst. As the addition polymerization catalyst, a known catalyst may be used.

The hydrogenated products of the ring-opening polymer of the norbornene monomers, the ring-opening copolymer of the norbornene monomer and the monomer which can undergo ring-opening copolymerization with the norbornene monomer, the addition polymer of the norbornene monomers, and the addition copolymer of the norbornene monomer and the monomer which can undergo addition copolymerization with the norbornene monomer may be obtained by adding a known hydrogenation catalyst to the unhydrogenated polymer and hydrogenating the carbon-carbon unsaturated bonds in an amount of preferably 90% or more.

As examples of the monocyclic olefin polymer, addition polymers of cyclohexene, cycloheptene, and cyclooctene can be given.

As examples of the cyclic conjugated diene polymer, 1,2-addition or 1,4-addition polymers of cyclic conjugated diene monomers such as cyclopentadiene and cyclohexadiene can be given.

The molecular weight of the thermoplastic resin forming each of the layers a and b determined as a polyisoprene-reduced (polystyrene-reduced when using toluene) weight average molecular weight measured by gel permeation chromatography using cyclohexane (toluene when the thermoplastic resin is not dissolved in cyclohexane) as a solvent is usually 10,000 to 300,000, preferably 15,000 to 250,000, and more preferably 20,000 to 200,000. When the molecular weight is within the above range, the mechanical strength and the formability of the film are well balanced.

The glass transition temperature of the thermoplastic resin forming each of the layers a and b may be arbitrarily selected depending on the application. The glass transition temperature of the thermoplastic resin is preferably 80° C. or more, and more preferably 100 to 250° C. When producing a base resin layer in the shape of a film using the thermoplastic resin having a glass transition temperature within the above range, a film can be obtained which does not produce deformation and stress during use at a high temperature and a high humidity and exhibits excellent durability.

The molecular weight distribution (weight average molecular weight (Mw)/number average molecular weight (Mn)) of the thermoplastic resin forming each of the layers a and b is usually 1.0 to 10.0, preferably 1.0 to 6.0, and more preferably 1.1 to 4.0, although the molecular weight distribution is not particularly limited. A base resin layer in the shape of a film exhibiting well-balanced mechanical strength and formability can be obtained by adjusting the molecular weight distribution within the above range.

(Flexural Modulus)

The base resin layer of the antireflective film of the present invention includes at least the layer a and the layer b respectively including a thermoplastic resin as the main component, and the layer a has a flexural modulus higher than that of the layer b.

The term "flexural modulus" refers to the ratio of load and deflection when applying a flexural load to an object. In more detail, when strains at two specific points are $\epsilon1$ and $\epsilon2$ and stress corresponding to these strains are $\rho1$ and $\rho2$, the term "flexural modulus" refers to a value obtained by dividing the difference in stress ($\rho2-\rho1$) by the difference in strain ($\epsilon2-\epsilon1$).

In general, a polymer exhibiting high tenacity has a low flexural modulus, and a polymer exhibiting high surface hardness has a high flexural modulus. The present invention provides an antireflective film exhibiting high tenacity and high surface hardness by using a layer formed by combining the layer a which has a relatively high flexural modulus and exhibits high surface hardness and the layer b which has a relatively low flexural modulus and exhibits excellent toughness as the base resin layer of the antireflective film, and disposing the layer a closer to the antireflective layer (viewer) than the layer b.

It suffices that the layer a have a flexural modulus relatively higher than that of the layer b. In order to obtain an antireflective film exhibiting higher tenacity and higher surface hardness, it is preferable that the layer a have a flexural modulus of 3 GPa or more, and preferably 3 GPa to 4 GPa, and the layer b have a flexural modulus of less than 3 GPa, and preferably 0.1 GPa to 3 GPa. If the flexural modulus of the layer a exceeds 4 GPa, opacity or melt viscosity may be increased, whereby it may become difficult to form a film. If the flexural modulus of the layer b is less than 0.1 GPa, melt viscosity may be decreased, whereby it may become difficult to form a film.

The difference in flexural modulus between the layers a and b is not particularly limited insofar as the layer a has a flexural modulus relatively higher than that of the layer b. The difference in flexural modulus between the layers a and b is preferably 0.2 GPa to 2.5 GPa, and more preferably 0.5 GPa to 2.0 GPa. If the difference in flexural modulus between the layers a and b is too small, the balance between the tenacity and the surface hardness of the resulting antireflective film may deteriorate. If the difference in flexural modulus between the layers a and b is too large, it may be difficult to form a uniform stacked film when molding the film.

As examples of a preferred combination of the layers a and b, a vinyl aromatic polymer/alicyclic structure-containing polymer and a poly(meth)acrylate polymer/alicyclic structure-containing polymer (layer a/layer b) can be given, since water vapor transmission rate, tenacity, and surface hardness are well balanced. In particular, combinations of a polystyrene/alicyclic structure-containing polymer, styrene-maleic acid copolymer/alicyclic structure-containing polymer, and polymethyl methacrylate/alicyclic structure-containing polymer are preferable.

It suffices that the base resin layer be a laminate including at least the layers a and b. The base resin layer may include a layer c opposite to the layer a through the layer b, or may include a layer x optionally provided between the layers a and b.

The layer c is provided in order to prevent the antireflective film from curling, and may be formed of a material exhibiting affinity with the resin forming the layer a and the resin forming the layer b. As an example of the layer c, a layer formed of a thermoplastic resin having high transparency and exhibiting affinity with the resin forming the layer a and the resin forming the layer b. The layer c may be formed of the same resin as the layer a or b.

The layer c is provided in order to prevent the antireflective film from curling. The layer c cannot prevent curling if the thickness of the layer c is too small or too great. The thickness of the layer c is usually 5 to 100 μm, and preferably 10 to 50 μm.

The layer x may be formed of a resin exhibiting affinity with the resin forming the layer a and the resin forming the layer b. As examples of the material for the layer x, a polyesterurethane resin, a polyetherurethane resin, a polyisocyanate resin, a polyolefin copolymer, a resin having a hydrocarbon skeleton in the main chain, a polyamide resin, an acrylic resin, a vinyl chloride-vinyl acetate copolymer, chlorinated rubber, cyclized rubber, a modified product obtained by introducing a polar group into these polymers, and the like can be given. Of these, it is preferable to use the polyolefin copolymer, the resin having a hydrocarbon skeleton in the main chain, and the modified product thereof.

As examples of the polyolefin copolymer, an olefin-(meth) acrylate copolymer such as an ethylene-methyl(meth)acrylate copolymer and an ethylene-ethyl (meth)acrylate copolymer; a ternary copolymer obtained by copolymerizing an olefin such as ethylene, (meth)acrylic acid ester, and another copolymerisable monomer (e.g. propylene, maleic acid, or vinyl acetate); an ethylene-vinyl acetate copolymer; an ethylene-styrene copolymer; an ethylene-glycidyl(meth)acrylate copolymer; and the like can be given.

As examples of the method of introducing a polar group into the polyolefin copolymer, oxidation, saponification, chlorination, chlorosulfonation, addition of an unsaturated carboxylic acid, and the like can be given. Of these, the addition of an unsaturated carboxylic acid is preferably used.

As examples of the resin having a hydrocarbon skeleton in the main chain, a resin having a polybutadiene skeleton or a resin having an at least partially hydrogenated polybutadiene skeleton can be given. As specific examples of these resins, a polybutadiene resin, a hydrogenated polybutadiene resin, a styrene-butadiene-styrene block copolymer (SBS copolymer), a hydrogenated styrene-butadiene-styrene block copolymer (SEBS copolymer), and the like can be given. Of these, a modified product of the hydrogenated product of the styrene-butadiene-styrene block copolymer is suitable.

As the compound for introducing a polar group used to obtain the modified polymer, a carboxylic acid or its derivative is preferable. As examples of the carboxylic acid and its derivative, unsaturated carboxylic acids such as acrylic acid, methacrylic acid, maleic acid, and fumaric acid; derivatives of the unsaturated carboxylic acid (e.g. halide, amide, imide, anhydride, and ester) such as maleyl chloride, maleimide, maleic anhydride, and citraconic anhydride; and the like can be given. Of these, the modified product of the unsaturated carboxylic acid or the unsaturated carboxylic anhydride may be suitably used due to excellent adhesion. As the unsaturated carboxylic acid or the unsaturated carboxylic anhydride, acrylic acid, methacrylic acid, maleic acid, and maleic anhydride are preferable, with maleic acid and maleic anhydride being still more preferable. The above unsaturated carboxylic acid and the like may be used in combination of two or more or may be modified.

The method of producing the base resin layer is not particularly limited. For example, (i) a method including separately forming the layers a and b and stacking the layers a and b through the layer x by means of dry lamination to obtain a laminate, (ii) a method including forming the layers a and b by means of coextrusion to obtain a laminate, and the like can be given. In particular, the coextrusion method (ii) is preferable since the method (ii) allows provision of a laminate having a large interlayer peel strength and exhibits excellent production efficiency.

When producing the laminate using the coextrusion method, the layers a and b are formed by extruding the resin material for the layer a and the resin material for the layer b from a die for multilayer using a plurality of extruders.

When producing the base resin layer by coextrusion, an additive may be added to the layer a, the layer b and/or the layer c in such an amount that the object of the present invention is not impaired.

The additive which may be used is not particularly limited. As examples of the additive, a layer crystal compound; an inorganic particle; a stabilizer such as an antioxidant, a thermal stabilizer, a light stabilizer, a weatherability stabilizer, a UV absorber, and a near-infrared ray absorber; a resin modifier such as a lubricant and a plasticizer; a coloring agent such as a dye and a pigment; an antistatic agent; and the like can be given. These additives may be used either individually or in combination of two or more. The amount of the additive may be arbitrarily determined insofar as the object of the present invention is not impaired.

The total thickness of the resulting base resin layer is usually 30 to 200 μm, preferably 40 to 150 μm, and particularly preferably 50 to 100 μm.

The thickness of the layer a included in the base resin layer is usually 5 to 100 μm, and preferably 10 to 50 μm. If the thickness of the layer a is less than 5 μm, surface hardness may not be increased.

If the thickness of the layer a exceeds 100 μm, the film may become fragile.

The thickness of the layer b is usually 5 to 100 μm, and preferably 10 to 50 μm. If the thickness of the layer b is less than 5 μm, the film may become fragile. If the thickness of the layer b exceeds 100 μm, the transparency of the film may deteriorate. Moreover, the thickness of the entire antireflective film may be increased, whereby a reduction in size of a display may be hindered.

When the base resin layer includes the layer x, the thickness of the layer x is usually 0.1 to 20 μm, preferably 1 to 10 μm, and more preferably 2 to 7 μm. If the thickness of the layer x exceeds 20 μm, surface hardness may not be increased.

In the antireflective film of the present invention, it is preferable that the base resin layer have a low water vapor transmission rate. As described later, the degree of polarization of the polarizer gradually decreases as the polarizer absorbs water in air. Therefore, a polarizer plate exhibiting excellent durability can be obtained by bonding the base resin layer with a low water vapor transmission rate to the polarizer.

The water vapor transmission rate may be measured using a method in accordance with JIS K7209.

The base resin layer may be used which is subjected to surface modification on one side or each side. The adhesion of the base resin layer with a low-refractive-index layer or another layer described later can be improved by providing the base resin layer with surface modification. As examples of the surface modification, an energy ray irradiation treatment, a chemical treatment, and the like can be given.

As examples of the energy ray irradiation treatment, a corona discharge treatment, a plasma treatment, an electron beam irradiation treatment, an ultraviolet radiation irradiation treatment, and the like can be given. Of these, the corona discharge treatment and the plasma treatment are preferable in view of the treatment efficiency and the like, with the corona discharge treatment being particularly preferable. As the chemical treatment, a method can be given in which the transparent film is immersed in an oxidizing agent aqueous solution such as a potassium dichromate solution or concentrated sulfuric acid, and sufficiently washed with water. In the chemical treatment, it is effective to shake the container in a state in which the transparent film is immersed in the oxidizing agent aqueous solution. However, the surface of the transparent film may be dissolved or the transparency of the transparent film may be decreased if the transparent film is chemically treated for a long time. Therefore, it is necessary to adjust the treatment time and the like depending on the reactivity, concentration, and the like of the chemical used.

FIGS. 1-a to 1-f show specific examples of the layer configuration of the base resin layer. In FIGS. 1-a to 1-f, a symbol 1a indicates the layer a, a symbol 1b indicates the layer b, a symbol 1c indicates the layer c, and a symbol 1x indicates the adhesive layer (layer x).

FIG. 1-a shows a base resin layer (10A) having a two-layer structure formed of the layers a and b, FIG. 1-b shows a base resin layer (10B) having a three-layer structure formed of the layers a, b, and a, FIG. 1-c shows a base resin layer (10C) having a three-layer structure formed of the layers a, b, and c, FIG. 1-d shows a base resin layer (10D) having a three-layer structure formed of the layers a, x, and b, FIG. 1-e shows a base resin layer (10E) having a five-layer structure formed of the layers a, x, b, x, and a, and FIG. 1-f shows a base resin layer (10F) having a five-layer structure formed of the layers a, x, b, x, and c. The base resin layer forming the antireflective film of the present invention is not limited to the configurations shown in FIGS. 1-a to 1-f. It suffices that the base resin layer include at least the layers a and b.

Of these, the base resin layer (10D) having a three-layer structure formed of the layers a, x, and b shown in FIG. 1-d and the base resin layer (10E) having a five-layer structure formed of the layers a, x, b, x, and a shown in FIG. 1-e are preferable, since an antireflective film exhibiting high tenacity and high surface hardness can be obtained.

(2) Antireflective Layer

In the antireflective film of the present invention, the antireflective layer is formed on the layer a of the base resin layer. The antireflective layer is a layer having a function of suppressing reflection at the interface and improving the light transmittance. As the antireflective layer, an antireflective layer having a known layer configuration may be employed. As examples of the antireflective layer, an antireflective layer formed of a low-refractive-index layer having a relatively low refractive index, an antireflective layer formed by stacking a high-refractive-index layer having a relatively high refractive index and a low-refractive-index layer having a relatively low refractive index, and the like can be given.

As the antireflective layer of the antireflective film of the present invention, it is preferable to use an antireflective layer including a low-refractive-index layer having a refractive index of preferably 1.40 or less, more preferably 1.25 to 1.38, and still more preferably 1.25 to 1.36.

If the refractive index of the low-refractive-index layer exceeds 1.40, desired antireflective effects may not be obtained. If the refractive index of the low-refractive-index layer is too low (less than 1.25), the strength of the low-refractive-index layer may be low, whereby the mechanical strength required for the antireflective film may not be obtained. The refractive index may be measured using a known spectroscopic ellipsometer, for example.

As examples of the antireflective layer including such a low-refractive-index layer, an antireflective layer including a high-refractive-index layer including an activated energy ray-curable resin and inorganic oxide particles and having a refractive index of 1.55 or more over the entire layer and a low-refractive-index layer provided on the high-refractive-index layer and having a refractive index of 1.40 or less, or a low-refractive-index layer having a refractive index of 1.25 to 1.40 and showing a change in reflectance after a steel wool test of 50% or less can be given.

The low-refractive-index layer having a refractive index of 1.40 or less may be formed by applying a composition including inorganic compound hollow particles (hereinafter called "low-refractive-index layer forming composition") to a base resin layer (base resin film) or another layer stacked on the base resin layer (base resin film), and optionally drying and heating the composition, for example. In particular, it is preferable to use a composition including a metal oxide complex as the low-refractive-index layer forming composition.

As the metal oxide complex, it is preferable to use a metal oxide complex formed of at least one compound selected from the group consisting of the following compounds (a) to (c) and including a —(O-M)$_m$-O— bond (M represents a metal atom or a semimetal atom, and m represents a positive integer) in the molecule.

(a) Compound of the Formula (1): $MX_n$
(b) Partial Hydrolysate of at Least One Compound of the Formula (1)
(c) Complete Hydrolysate of at Least One Compound of the Formula (1)

As examples of the metal atom or the semimetal atom M in the compound (a) of the formula (1), alkali metals such as lithium, sodium, and potassium; alkaline earth metals such as magnesium, calcium, barium, and strontium; group 3B elements of the periodic table such as boron, aluminum, gallium, indium, and thallium; group 4B elements of the periodic table such as silicon, germanium, tin, and lead; group 5B elements of the periodic table such as phosphorus, arsenic, and antimony; transition metal elements such as scandium, titanium, vanadium, iron, nickel, copper, zinc, yttrium, zirconium, niobium, tantalum, and tungsten; lanthanoids such as lanthanum, cerium, and neodymium; and the like can be given. Of these, the group 3B elements, the group 4B elements, and the transition metal elements are preferable, with aluminum, silicon, titanium, and zirconium being more preferable, and silicon (Si) being still more preferable.

As examples of X, halogen atoms such as chlorine atom and bromine atom; monovalent hydrocarbon groups which may have a substituent; oxygen atom; organic acid radicals such as acetic acid radical and nitric acid radical; beta-diketonate groups such as acetylacetonate; inorganic acid radicals such as nitric acid radical and sulfuric acid radical; alkoxy groups such as methoxy group, ethoxy group, n-propoxy group, and n-butoxy group; acyloxy groups such as acetoxy group and propionyloxy group; an oxime group (—O—N═C—R'(R")); an enoxy group (—O—C(R')═C(R")R'''), amino group, an aminoxy group (—O—N(R')R"); an amide group (—N(R')—C(═O)—R"); and the like can be given. In these groups, R', R", and R''' individually represent hydrogen atom or a monovalent hydrocarbon group.

n represents the valence of M (metal atom or semimetal atom). When n is two or more, the Xs may be the same or different.

As the compound of the formula (1), a silicon compound of the formula (2): $R_wSiY_{4-w}$ (R represents a monovalent hydrocarbon group which may have a substituent, w represents an integer from 0 to 2, provided that, when w is two, the Rs may be the same or different, Y individually represents a hydrolyzable group) is particularly preferable.

As examples of the monovalent hydrocarbon group which may have a substituent, alkyl groups such as methyl group, ethyl group, propyl group, butyl group, pentyl group, hexyl group, heptyl group, and octyl group; cycloalkyl groups such as cyclopentyl group and cyclohexyl group; aryl groups which may have a substituent such as phenyl group, 4-methylphenyl group, 1-naphthyl group, and 2-naphthyl group; alkenyl groups such as vinyl group and allyl group; aralkyl groups such as benzyl group, phenethyl group, and 3-phenylpropyl group; haloalkyl groups such as chloromethyl group, γ-chloropropyl group, and 3,3,3-trifluoropropyl group; alkenylcarbonyloxyalkyl groups such as γ-methacryloxypropyl group; epoxy group-containing alkyl groups such as γ-glycidoxypropyl group and 3,4-epoxycyclohexylethyl group; mercapto group-containing alkyl groups such as γ-mercaptopropyl group; amino group-containing alkyl groups such as 3-aminopropyl group; and the like can be given. Of these, an alkyl group having 1 to 4 carbon atoms or phenyl group is preferable due to ease of synthesis and availability.

Y represents a hydrolyzable group. The term "hydrolyzable group" used herein refers to a group which is hydrolyzed optionally in the presence of an acid or base catalyst to produce a —(O—Si)$_m$—O— bond.

As examples of the hydrolyzable group, alkoxy groups such as a methoxy group, an ethoxy group, and a propoxy group; acyloxy groups such as an acetoxy group and a propionyloxy group; an oxime group (—O—N═C—R'(R")); an enoxy group (—O—C(R')═C(R")R'''); an amino group; an aminoxy group (—O—N(R')R"); an amide group (—N(R')—C(═O)—R"); and the like can be given. In these groups, R', R", and R''' have the same meanings as described above. As the hydrolyzable group represented by Y, the alkoxy group is preferable due to availability and the like.

As specific examples of the silicon compound of the formula (2), an alkoxysilane, acetoxysilane, oximesilane, enoxysilane, aminosilane, aminoxysilane, amidesilane, and the like can be given. Of these, the alkoxysilane is preferable due to availability.

As examples of the tetraalkoxysilane in which w in the formula (2) is 0, tetramethoxysilane, tetraethoxysilane, and the like can be given. As examples of the organotrialkoxysilane in which w in the formula (2) is 1, methyltrimethoxysilane, methyltriethoxysilane, methyltriisopropoxysilane, phenyltrimethoxysilane, phenyltriethoxysilane, 3,3,3-trifluoropropyltrimethoxysilane, and the like can be given. As examples of the diorganodialkoxysilane in which w in the formula (2) is 2, dimethyldimethoxysilane, dimethyldiethoxysilane, diphenyldimethoxysilane, diphenyldiethoxysilane, methylphenyldimethoxysilane, and the like can be given.

The molecular weight of the compound of the formula (1) is preferably 40 to 300, and more preferably 100 to 200, although the molecular weight is not particularly limited.

The partial hydrolysate (b) of at least one compound of the formula (1) (hereinafter called "compound (3)") and the complete hydrolysate (c) of at least one compound of the formula (1) (hereinafter called "compound (4)") may be obtained by completely or partially hydrolyzing and condensing one or more compounds of the formula (1).

The compounds (3) and (4) may be obtained by hydrolyzing a metal tetraalkoxide shown by M(Or)$_4$ (M is the same as defined above, and r represents a monovalent hydrocarbon group) in the presence of water in such an amount that the molar ratio [H$_2$O]/[Or] is 1.0 or more such as 1.0 to 5.0, and preferably 1.0 to 3.0, for example.

The hydrolysis may be effected by stirring the entire solution at a temperature of 5 to 100° C. for 2 to 100 hours.

When hydrolyzing the compound of the formula (1), a catalyst may be used, as required. The catalyst used is not particularly limited. It is preferable to use an acid catalyst since the resulting partial hydrolyzate and/or complete hydrolysate tends to have a two-dimensional crosslinked structure so that the resulting condensed compound tends to become porous, and the time required for hydrolysis is reduced.

The acid catalyst used is not particularly limited. As examples of the acid catalyst, organic acids such as acetic acid, chloroacetic acid, citric acid, benzoic acid, dimethylmalonic acid, formic acid, propionic acid, glutaric acid, glycolic acid, maleic acid, malonic acid, toluenesulfonic acid, and oxalic acid; inorganic acids such as hydrochloric acid, nitric acid, and halogenated silane; acidic sol fillers such as acidic colloidal silica and titania oxide sol; and the like can be given. These acid catalysts may be used either individually or in combination of two or more.

A base catalyst such as an aqueous solution of a hydroxide of an alkali metal or an alkaline earth metal such as sodium hydroxide or calcium hydroxide, aqueous ammonia, or an amine aqueous solution may be used instead of the acid catalyst.

The molecular weights of the compounds (3) and (4) are not particularly limited. The weight average molecular weights of the compounds (3) and (4) are usually 200 to 5000.

Since the low-refractive-index layer forming composition is applied to the base resin film or another layer to form a coating, and there may be a case where it is preferable that the matrix forming material be at least partially hydrolyzed, it is preferable that the low-refractive-index layer forming composition include water or a mixture of water and an organic solvent.

As examples of the organic solvent used, hydrophilic organic solvents such as lower aliphatic alcohols such as methanol, ethanol, isopropanol, n-butanol, and isobutanol; ethylene glycol derivatives such as ethylene glycol, ethylene glycol monobutyl ether, and ethylene glycol monoethyl ether acetate; diethylene glycol derivatives such as diethylene glycol and diethylene glycol monobutyl ether; diacetone alcohol; and a combination of two or more of these solvents can be given.

Aromatic hydrocarbons such as toluene and xylene; aliphatic hydrocarbons such as n-hexane and n-heptane; esters such as ethyl acetate and butyl acetate; ketones such as methyl ethyl ketone and methyl isobutyl ketone; oximes such as methyl ethyl ketoxime; a combination of two or more of these solvents; or the like may be used in addition to the hydrophilic organic solvent.

When the low-refractive-index layer forming composition includes the compounds (a) and (b), it is preferable that the low-refractive-index layer forming composition include a curing catalyst. In this case, when applying the low-refractive-index layer forming composition to the surface of the base resin film to form a coating and drying the coating, condensation reaction is promoted so that the crosslink density in the coating is increased, whereby the water resistance and the alkali resistance of the coating can be improved.

As examples of the curing catalyst used, metal chelate compounds such as a Ti chelate compound and Zr chelate compound; organic acids; and the like can be given.

The low-refractive-index layer forming composition may further include a known silane coupling agent. When the low-refractive-index layer forming composition includes the silane coupling agent, adhesion between the base resin film and the low-refractive-index layer may be improved when forming the low-refractive-index layer on the base resin film using the low-refractive-index layer forming composition.

The method of applying the low-refractive-index layer forming composition to the base resin film is not particularly limited. A known coating method may be used. As examples of the coating method, wire bar coating, dipping, spraying, spin coating, roll coating, and the like can be given.

After the coating of the low-refractive-index layer forming composition has been formed, the coating is optionally subjected to firing, ultraviolet irradiation, or the like to form a low-refractive-index layer. The temperature of optional heating is usually 50 to 200° C., and preferably 80 to 150° C.

The thickness of the resulting low-refractive-index layer is usually 10 to 1000 nm, and preferably 50 to 500 nm.

In the antireflective film of the present invention, when the antireflective layer is formed of a low-refractive-index layer, another layer may be provided between the base resin layer and the low-refractive-index layer.

When the antireflective layer is formed of a high-refractive-index layer and a low-refractive-index layer, another layer may be provided between the base resin layer and the high-refractive-index layer or between the high-refractive-index layer and the low-refractive-index layer.

As examples of such a layer, a hard coating layer and a primer layer can be given.

The hard coating layer is formed to increase the surface hardness, cycle fatigue resistance, and scratch resistance of the base resin layer or the high-refractive-index layer (hereinafter may be called "support"). The material for the hard coating layer is not particularly limited insofar as the material exhibits a hardness of "HB" or more in a pencil hardness test specified in JIS K5400. As examples of the material for the hard coating layer, an organic hard coating material such as an organosilicone material, a melamine material, an epoxy material, an acrylic material, and a urethane acrylate material; an inorganic hard coating material such as silicon dioxide; and the like can be given. It is preferable to use a urethane acrylate or polyfunctional acrylate hard coating material from the viewpoint of excellent adhesion and productivity. The hard coating layer may include an inorganic filler.

The method of forming the hard coating layer is not particularly limited. For example, the hard coating layer may be formed by applying a coating liquid for forming the hard coating layer to the support using a known coating method, and curing the coating liquid by applying ultraviolet rays. The thickness of the hard coating layer is usually 0.5 to 30 μm, and preferably 3 to 15 μm, although the thickness of the hard coating layer is not particularly limited.

The primer layer is formed to provide and improve adhesion between the support and the low-refractive-index layer. As examples of the material for the primer layer, a polyesterurethane resin, a polyetherurethane resin, a polyisocyanate resin, a polyolefin resin, a resin having a hydrocarbon skeleton in the main chain, a polyamide resin, an acrylic resin, a polyester resin, a vinyl chloride-vinyl acetate copolymer, chlorinated rubber, cyclized rubber, a modified product obtained by introducing a polar group into these polymers, and the like can be given. Of these, a modified product of the resin having a hydrocarbon skeleton in the main chain and a modified product of the rubber may be suitably used.

The method of forming the primer layer is not particularly limited. For example, a method can be given which includes applying a primer layer forming coating liquid to the support using a known coating method to form the primer layer. The thickness of the primer layer is usually 0.01 to 5 μm, and preferably 0.1 to 2 μm, although the thickness is not particularly limited.

Various additives may be optionally added to the resin materials for the support, the hard coating layer, and the primer layer. The additive is not particularly limited insofar as it is generally used in a thermoplastic resin material. As examples of the additive, antioxidants such as a phenol antioxidant, phosphoric acid antioxidant, and sulfur antioxidant; UV absorbers such as a benzotriazole UV absorber, benzoate UV absorber, benzophenone UV absorber, acrylate UV absorber, and metal complex UV absorber; light stabilizers such as a hindered amine light stabilizer; coloring agents such as a dye and pigment; lubricants such as a fatty alcohol ester, polyhydric alcohol ester, fatty acid amide, and inorganic particles; plasticizers such as a triester plasticizer, phthalate plasticizer, fatty acid-base acid ester plasticizer, and oxy acid ester plasticizer; antistatic agents such as a fatty acid ester of a polyhydric alcohol and conductive inorganic oxide particles; and the like can be given.

In the antireflective film of the present invention, a stainproof layer may be formed on the low-refractive-index layer in order to protect the low-refractive-index layer and increase stainproof properties.

The material for forming the stainproof layer is not particularly limited insofar as the function of the low-refractive-index layer is not hindered and the performance required for the stainproof layer is satisfied. In general, a compound having a hydrophobic group may be preferably used.

As specific examples of the compound having a hydrophobic group, a perfluoroalkylsilane compound, a perfluoropolyether silane compound, and a fluorine-containing silicone compound can be given. As the method of forming the stainproof layer, physical vapor deposition such as evaporation or sputtering; chemical vapor deposition; a wet low-refractive-index layer formation method; or the like may be used. The thickness of the stainproof layer is preferably 20 nm or less, and still more preferably 1 to 10 nm, although the thickness is not particularly limited.

The reflectance of the antireflective film of the present invention is usually 1.5% or less, preferably 1.2% or less, and more preferably 1.0% or less. A film showing a small change in reflectance before and after a steel wool test exhibits excellent mechanical strength. The reflectance may be determined as a reflectance at a wavelength of 550 nm by measuring the reflection spectrum at a specific incident angle using a known spectrophotometer, for example.

Figure 2:
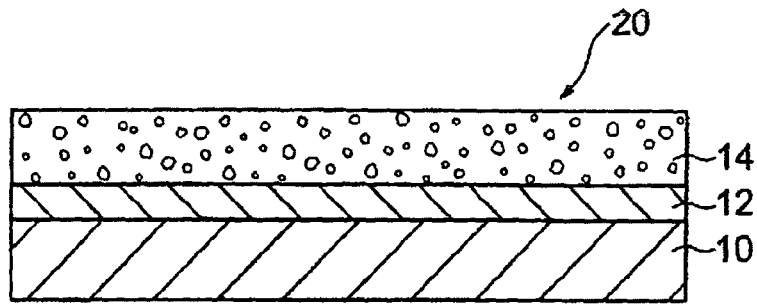
FIG. 2 is a view showing a layer configuration example of the antireflective film of the present invention.

FIG. 2 shows a layer configuration example of the antireflective film of the present invention. An antireflective film 20 shown in FIG. 2 has a structure in which a high-refractive-index layer 12 formed on a base resin layer 10 and a low-refractive-index layer 14 is stacked on the high-refractive-index layer 12. The antireflective film of the present invention is not limited to the configuration shown in FIG. 2. For example, the antireflective film of the present invention may have a structure in which two or more high-refractive-index layers are formed on the base resin layer and the low-refractive-index layer is formed on the high-refractive-index layer.

The antireflective film of the present invention exhibits excellent transparency, antireflection performance, tenacity, and surface hardness, and is useful as an antireflective film for flat panels. Specifically, the antireflective film of the present invention is useful as an antireflective film for liquid crystal display devices such as a portable telephone, a digital information terminal, a Pocket Bell®, a navigation system, an onboard liquid crystal display, a liquid crystal monitor, a modulated light panel, a display for office automation (OA) instruments, and a display for audio-visual (AV) instruments; an electroluminescent display device, a touch panel, a rear-projection TV, a plasma display, a CRT, an organic electroluminescent (EL) display, electronic paper, and the like.

2) Polarizer Plate

A polarizer plate of the present invention is produced by bonding the antireflective film of the present invention to a polarizer.

The polarizer used is not particularly limited insofar as the polarizer has a function to polarize the incident light. As examples of the polarizer, polarizers formed of polyvinyl alcohol (PVA) and polyene can be given.

The method of producing the polarizer is not particularly limited. As examples of the method of producing a PVA polarizer, a method including causing an iodine ion to be adsorbed on a PVA film and uniaxially stretching the PVA film, a method including uniaxially stretching a PVA film and causing an iodine ion to be adsorbed on the PVA film, a method including causing an iodine ion to be adsorbed on a PVA film while uniaxially stretching the PVA film, a method including dyeing a PVA film with a dichroic dye and uniaxially stretching the PVA film, a method including uniaxially stretching a PVA film and dyeing the PVA film with a dichroic dye, and a method including dyeing a PVA film with a dichroic dye while uniaxially stretching the PVA film can be given.

As examples of the method of producing a polyene polarizer, known methods such as a method including uniaxially stretching a PVA film and heating/dehydrating the PVA film in the presence of a dehydration catalyst, and a method including uniaxially stretching a polyvinyl chloride film and heating/dehydrating the polyvinyl chloride film in the presence of a hydrochloric acid removal catalyst can be given.

The polarizer plate of the present invention may be produced by stacking the polarizer on the side of the antireflective film of the present invention on which the antireflective layer is not formed.

The antireflective film and the polarizer may be stacked using an arbitrary bonding means such as an adhesive or a pressure-sensitive adhesive. As examples of the adhesive or the pressure-sensitive adhesive, an acrylic, silicone, polyester, polyurethane, polyether, or rubber adhesive or pressure-sensitive adhesive can be given. Of these, the acrylic adhesive or pressure-sensitive adhesive is preferable from the viewpoint of heat resistance, transparency, and the like.

In the polarizer plate of the present invention, a protective layer may be formed on the polarizer through an adhesive or pressure-sensitive adhesive layer on the side on which the antireflective film of the present invention is not stacked.

The protective layer is a layer exhibiting high transparency and having a function of protecting the polarizer. It is preferable that the protective layer be a layer exhibiting a variation in in-plane retardation ($\Delta R$) within ±2%.

When the in-plane main refractive indices of the film are nx and ny and the thickness of the film is d (nm), the in-plane retardation (Re) of the film can calculated by Re=(nx−ny)×d. When the in-plane main refractive indices of the film are nx and ny, the refractive index in the direction of the thickness of the film is nz, and the thickness of the film is d (nm), the in-plane retardation (Rth) in the direction of the thickness of the film can be calculated by Rth=((nx+ny)/2−nz)×d.

The refractive indices (nx, ny, nz) are measured five times at five arbitrary places in the film plane using a known automatic birefringence meter, the retardations (Re, Rth) are calculated using the measurement results, and the average value of the calculation results is taken as a representative retardation.

The variation in retardation ($\Delta R$) may be calculated by the following expression (1) or (2). The largest value obtained by the expressions (1) and (2) is taken as the variation in retardation ($\Delta R$). R indicates the representative retardation, Rmin indicates the minimum retardation, and Rmax indicates the maximum retardation.

$$\Delta R=(R-R\text{min})/R\times100(\%) \tag{1}$$

$$\Delta R=(R-R\text{max})/R\times100(\%) \tag{2}$$

As the resin for the protective layer, a resin exhibiting excellent transparency is preferable. As examples of the resin for the protective layer, an alicyclic structure-containing polymer, a cellulose resin, and a polycarbonate resin can be given.

As examples of the alicyclic structure-containing polymer and the cellulose resin, the resins given as examples for the layer b of the base resin layer can be given.

The polycarbonate resin is a thermoplastic resin having a carbonate bond and is obtained by reacting an aromatic dihydric phenol compound and phosgene or a carbonic acid diester. As examples of the dihydric phenol compound, 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, 1-phenyl-1,1-bis(4-hydroxyphenyl)ethane, and the like can be given.

The protective layer may or may not exhibit birefringence. A layer exhibiting birefringence is not particularly limited insofar as the layer exhibits a retardation due to birefringence. For example, a layer obtained by providing a transparent resin layer with birefringence by stretching or the like, a liquid crystal polymer oriented film, and a layer obtained by causing an anisotropic material such as a liquid crystal polymer to be oriented on an oriented film such as a transparent resin layer. Of these, a layer obtained by providing a transparent resin layer with birefringence by stretching or the like is preferable.

The stretching for providing a transparent resin layer with birefringence may be performed using an arbitrarily method such as uniaxial stretching or biaxial stretching using a free end or a fixed end. In the present invention, a film oriented in the thickness direction, a film in which the direction of the main refractive index in the thickness direction is inclined with respect to the normal direction of the film, or the like may also be used as the layer exhibiting birefringence.

As the resin for the protective layer, the alicyclic structure-containing polymer and the cellulose resin are preferable due to excellent transparency, birefringence, dimensional stability, and the like, with the alicyclic structure-containing polymer being particularly preferable.

The protective layer may be formed of a single layer or may be a laminate formed of a plurality of layers.

The total thickness of the protective layer is usually 20 to 300 μm, and preferably 40 to 200 μm.

Figure 3:
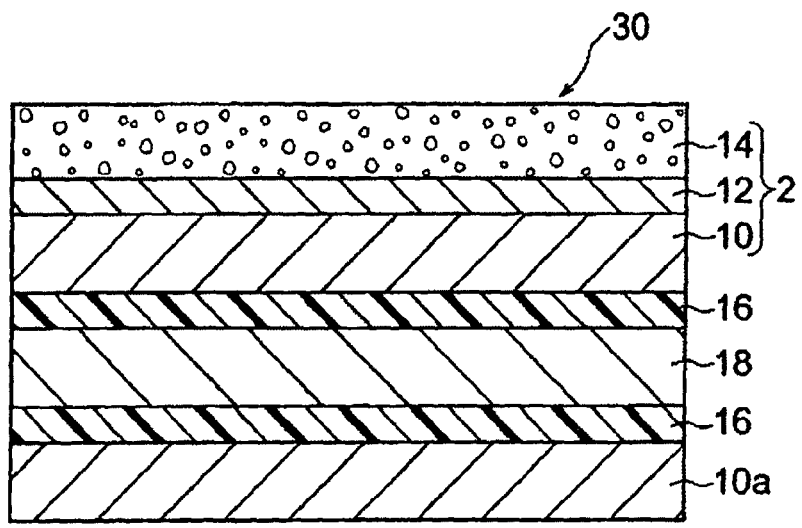
FIG. 3 is a view showing an layer configuration example of the polarizer plate of the present invention.

FIG. 3 is a cross-sectional view showing an example of the layer configuration of the polarizer plate of the present invention. A polarizer plate 30 shown in FIG. 3 has a structure in which a polarizer 18 is stacked on the antireflective film 20 of the present invention through an adhesive or pressure-sensitive adhesive layer 16 on the side on which a high-refractive-index layer 12 and a low-refractive-index layer 14 are not formed, and a protective film 10a is stacked on the other side of the polarizer 18 through an adhesive or pressure-sensitive adhesive layer 16.

Since the polarizer plate of the present invention utilizes the antireflective film of the present invention, the polarizer plate of the present invention exhibits excellent antireflection performance, tenacity, and surface hardness.

3) Display

A display of the present invention includes the polarizer plate of the present invention. As preferred examples of the display of the present invention, a liquid crystal display device and the like can be given.

Figure 4:
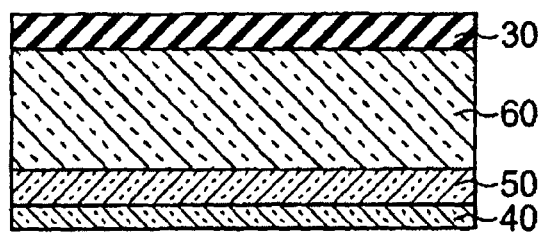
FIG. 4 is a cross-sectional view of the layer configuration of a liquid crystal display element forming a display (liquid crystal display device) of the present invention.
Figure 5:
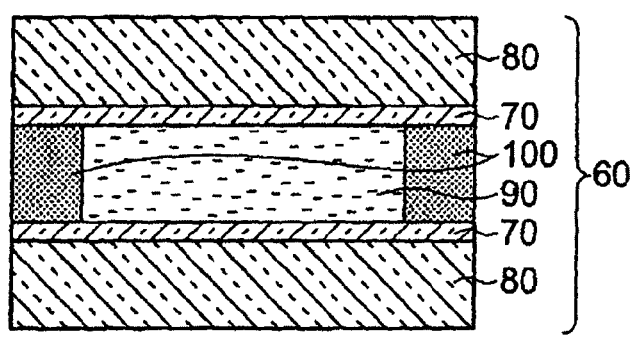
FIG. 5 is a cross-sectional view of a layer configuration of the liquid crystal display cell shown in FIG. 4.

FIG. 4 shows a layer configuration example of a liquid crystal display element of a liquid crystal display device as an example of the display including the polarizer plate of the present invention. The liquid crystal display element shown in FIG. 4 includes a polarizer plate 40, a retardation plate 50, a liquid crystal cell 60, and the polarizer plate 30 of the present invention. The polarizer plate 30 is bonded to the liquid crystal cell 60 through an adhesive or pressure-sensitive adhesive layer (not shown). As shown in FIG. 5, the liquid crystal cell 60 is formed by disposing electrode substrates 80, each having a transparent electrode 70, at a specific interval in a state in which the transparent electrodes 70 face each other, and sealing a liquid crystal 90 between the transparent electrodes 70, for example. In FIG. 5, a reference numeral 100 indicates a sealing material.

The liquid crystal mode of the liquid crystal 90 is not particularly limited. As examples of the liquid crystal mode, an in-plane switching (IPS) mode, a vertical alignment (VA) mode, a multi-vertical alignment (MVA) mode, a continuous pinwheel alignment (CPA) mode, a twisted nematic (TN) mode, a super-twisted nematic (STN) mode, a hybrid aligned nematic (HAN) mode, an optical compensated bend (OCB) mode, and the like can be given.

The liquid crystal display element shown in FIG. 4 may be used in a normally white mode in which a bright display occurs at a low applied voltage and a dark display occurs at a high applied voltage and a normally black mode in which a dark display occurs at a low applied voltage and a bright display occurs at a high applied voltage.

When providing a polarizer plate or an optical element on each side of the liquid-crystal cell, the polarizer plates or the optical elements may be the same or different. When forming the liquid crystal display device, an appropriate element such as a luminance increasing film, a prism sheet, a lens array sheet, a light-guiding plate, a diffuser plate, or a backlight may be disposed at an appropriate position in one or more layers.

Since the display of the present invention includes the polarizer plate of the present invention which exhibits excellent antireflection performance, scratch resistance, and productivity, the display exhibits excellent display performance, scratch resistance, and productivity.

EXAMPLES

The present invention is described below in more detail by way of examples and comparative examples. Note that the present invention is not limited to the following examples.

(1) Resin Material

Resin a:

Polymethyl methacrylate (hereinafter abbreviated as "PMMA", Acrypet VH001 manufactured by Mitsubishi Rayon Co., Ltd.)

Polystyrene (hereinafter abbreviated as "PS", Toyo Styrol GP. G320C manufactured by Toyo-Styrene Co., Ltd.)

Resin b:

Norbornene resin (hereinafter abbreviated as "NB", ZEONOR 1060 manufactured by Zeon Corporation)

Polycarbonate resin (hereinafter abbreviated as "PC", Panlite K-1300Y manufactured by Teijin Chemicals Ltd.)

Triacetyl cellulose (hereinafter abbreviated as "TAC", thickness: 40 μm, KC40X2M manufactured by Konica Minolta)

Adhesive Layer:

Ethylene-vinyl acetate copolymer (hereinafter abbreviated as "EVA1", EVAFLEX manufactured by Du pont-Mitsui Polychemicals Co., Ltd.)

Modified ethylene-vinyl acetate copolymer (hereinafter abbreviated as "EVA2", Mitsubishi Modic AP543)

(2) Measurement of Flexural Modulus

The flexural moduli of the layers a and b of the base resin layer were measured in accordance with JIS K7171 using a tensile tester (autograph AG-100kNIS manufactured by Shimadzu Corporation).

(3) Measurement of Water Vapor Transmission Rate (WVTR)

The WVTR was measured in accordance with JIS K7209.

Example 1

(1-1) Production of Transparent Film (1A) Forming Base Resin Layer

PMMA was supplied to a hopper provided to a double-flight 50-mm single-screw extruder (ratio of screw effective length L to screw diameter D (L/D)=28) equipped with a leaf-disk polymer filter with a pore diameter of 10 μm. The molten resin was supplied to a multi-manifold die with a die lip surface roughness Ra of 0.1 μm at an extruder exit temperature of 260° C. and an extruder gear pump rotational speed of 12 rpm.

NB was supplied to a double-flight 50-mm single-screw extruder (L/D=30) equipped with a leaf-disk polymer filter with a pore diameter of 10 μm. The molten resin was supplied to a multi-manifold die with a die lip surface roughness Ra of 0.1 μm at an extruder exit temperature of 260° C. and an extruder gear pump rotational speed of 6 rpm.

The molten PMMA (layer a), NB (layer b), and EVA1 (adhesive layer=layer x) were discharged from the multi-manifold die at 260° C. and cast onto a chill roll of which the temperature was adjusted to 130° C. The products were caused to pass through a chill roll of which the temperature was adjusted to 50° C. to obtain a coextruded transparent film (1A) with a width of 600 mm and a thickness of 80 μm formed of layer a (20 μm)-layer x (4 μm)-layer b (32 μm)-layer x (4 μm)-layer a (20 μm).

(1-2) Preparation of Primer Solution 2 parts of a hydrogenated product of a maleic anhydride modified styrene-butadiene-styrene block copolymer (Tuftec M1913 manufactured by Asahi Kasei Corporation, melt index: 1.0 g/10 min at 200° C. and 5 kg load, styrene block content: 30 wt %, hydrogenation rate: 80% or more, amount of maleic anhydride added: 2%) was dissolved in a mixed solvent of 8 parts of xylene and 40 parts of methyl isobutyl ketone. The mixture was filtered through a polytetrafluoroethylene filter with a pore size of 1 μm, and the filtrate was used as a primer solution.

(1-3) Preparation of Hard Coating Material 30 parts of a hexafunctional urethane acrylate oligomer (NK Oligo U-6HA manufactured by Shin-Nakamura Chemical Co., Ltd.), 40 parts of butyl acrylate, 30 parts of isobornyl methacrylate (NK Ester 1B manufactured by Shin-Nakamura Chemical Co., Ltd.), and 10 parts of 2,2-dimethoxy-1,2-diphenylethan-1-one were mixed using a homogenizer to prepare a hard coating material (UV-curable resin composition).

(1-4) Preparation of Low-Refractive-Index Layer Forming Coating Liquid

A tetramethoxysilane oligomer (Methyl Silicate 51 manufactured by Colcoat Co., Ltd.), methanol, water, and a 0.01N hydrochloric acid aqueous solution were mixed at a mass ratio of 21:36:2:2. The mixture was stirred at 25° C. for two hours in a high-temperature bath to obtain a silicone resin with a weight average molecular weight of 850. A hollow silica isopropanol dispersion sol (manufactured by Catalysts & Chemicals Industries Co., Ltd., solid content: 20 wt %, average primary particle diameter: about 35 nm, shell thickness: about 8 nm) was added to the silicone resin as hollow silica particles so that the weight ratio of "hollow silica microparticle/silicone resin (converted into condensed compound)" was 8:2 (solid content). The mixture was diluted with methanol so that the total solid content was 1% to obtain a low-refractive-index layer forming coating liquid.

(1-5) Production of Antireflective Film (2A)

The surfaces of the transparent film (1A) obtained in (1-1) were subjected to a corona discharge treatment for three seconds using a high-frequency generator (Corona Generator HV05-2 manufactured by Tamtec) at an output voltage of 100% and an output of 250 W utilizing a wire electrode with a diameter of 1.2 mm (length of electrode: 240 mm, distance between electrodes: 1.5 mm) so that the surface tension was 0.072 N/m to obtain a surface-modified base resin film.

The primer solution obtained in (1-2) was applied to one side of the surface-modified base resin film using a die coater so that the thickness of the primer layer after drying was 0.5 μm. The applied solution was dried in an oven at 80° C. for five minutes to obtain a base resin film including a primer layer.

The hard coating material obtained in (1-3) was continuously applied to the base resin film including the primer layer on the side of the primer layer using a die coater so that the thickness of the hard coating layer after curing was 5 μm. After drying the applied hard coating material at 80° C. for five minutes, the hard coating material was cured by applying ultraviolet rays (dose: 300 mJ/cm$^2$), and a hard coating layer stacked film was wound around a roll. The thickness of the hard coating layer was 5 μm.

After allowing the low-refractive-index layer forming coating liquid obtained in (1-4) to stand for one hour, the coating liquid was applied to the stacked film using a wire bar coater to obtain a coating with a thickness of about 100 nm. After drying the coating for one hour, the coating was heated at 120° C. for 10 minutes in oxygen to obtain an antireflective film (2A) provided with a low-refractive-index layer.

Example 2

A coextruded transparent film (1B) with a width of 600 mm and a thickness of 100 μm formed of layer a (20 μm)-layer x (4 μm)-layer b (52 μm)-layer x (4 μm)-layer a (20 μm) was obtained in the same manner as in Example 1 except for using PS as the resin a instead of PMMA. An antireflective film (2B) was produced in the same manner as in Example 1.

Example 3

A coextruded transparent film (1C) with a width of 600 mm and a thickness of 100 μm formed of layer a (30 μm)-layer x (4 μm)-layer b (66 μm) was obtained in the same manner as in Example 1 instead of a five-layer transparent film formed of three types of layers. An antireflective film (2C) was produced in the same manner as in Example 1.

Example 4

A coextruded transparent film (1D) with a width of 600 mm and a thickness of 100 μm formed of layer a (20 μm)-layer x (4 μm)-layer b (32 μm)-layer x (4 μm)-layer a (20 μm) was obtained in the same manner as in Example 1 except for using PC as the resin b instead of NB. An antireflective film (2D) was produced in the same manner as in Example 1.

Example 5

In Example 1, TAC was used as the resin b instead of NB. A 10-wt % toluene solution of EVA2 was applied to each side of the TAC film so that the thickness after drying was 3 μm. A PMMA film with a thickness of 20 μm was pressure-laminated on each side of the TAC film to obtain a transparent film (1E) with a width of 600 mm and a thickness of 86 μm formed of layer a (20 μm)-layer x (3 μm)-layer b (40 μm)-layer x (3 μm)-layer a (20 μm). An antireflective film (2E) was produced in the same manner as in Example 1.

Comparative Example 1

A transparent film (1F) with a thickness of 100 μm was obtained by extruding (single layer) PMMA, and an antireflective film (2F) was obtained in the same manner as in Example 1.

Comparative Example 2

An antireflective film (2G) was obtained in the same manner as in Example 1 except for using a single-layer NB transparent film (1G) with a thickness of 100 μm.

Example 6

(6-1) Production of Polarizer

A polyvinyl alcohol film (Kuraray Vinylon #7500 manufactured by Kuraray Co., Ltd.) with a thickness of 75 μm was secured using a chuck and was immersed in an aqueous solution of iodine (0.2 g/L) and potassium iodide (30 g/L) while subjecting the film to boric acid treatment for five minutes with uniaxial stretching by a factor of 6.0. The film was dried at room temperature for 24 hours to obtain a polarizer. The degree of polarization was 99.995%.

(6-2) Production of Transparent Film (3) Forming Protective Layer

A norbornene resin film (ZeonorFilm ZF-14-100 manufactured by Zeon Corporation, thickness: 100 μm) was simultaneously biaxially stretched using a simultaneous biaxial stretching machine at an oven temperature (preheating temperature, stretching temperature, and thermosetting temperature) of 136° C., a longitudinal stretching factor of 1.41, and a horizontal stretching factor of 1.41 to obtain a stretched film with a thickness of 89 μm. The in-plane retardation (Re) of the resulting stretched film was 20 nm, and the retardation (Rth) in the direction of the thickness was 300 nm. This stretched film (transparent film (3)) was used as the protective layer.

The in-plane retardation (Re) was measured as follows.
Specifically, the in-plane retardation (Re) was calculated by Re=(nx−ny)×d (nx and ny indicate the in-plane main refractive indices of the film, and d indicates the thickness of the film (nm)).

The retardation (Rth) in the direction of the thickness of the film was calculated by Rth=((nx+ny)/2−nz)×d (nx and ny indicate the in-plane main refractive indices of the film, nz indicates the refractive index in the direction of the thickness of the film, and d indicates the thickness of the film (nm)).

The refractive indices (nx, ny, nz) were measured five times at five arbitrary places in the film plane using a known automatic birefringence meter, the retardations (Re, Rth) were calculated using the measurement results, and the average value of the calculation results was taken as the representative retardation.

The variation in retardation (ΔR) may be calculated by the following expression (1) or (2). The largest value obtained by the expressions (1) and (2) is taken as the variation in retardation (ΔR). R indicates the representative retardation, Rmin indicates the minimum retardation, and Rmax indicates the maximum retardation.

As a result of measurement, the variations in retardations (Re) and (Rth) were within 2%, respectively.

$$\Delta R = (R - R\min)/R \times 100(\%) \quad (1)$$

$$\Delta R = (R - R\max)/R \times 100(\%) \quad (2)$$

(6-3) Surface Treatment of Antireflective Film (2A) and Transparent Film (3)

The surfaces of the antireflective film (2A) and the transparent film (3) were subjected to a corona discharge treatment for three seconds using a high-frequency generator (Corona Generator HV05-2 manufactured by Tamtec) at an output voltage of 100% and an output of 250 W utilizing a wire electrode with a diameter of 1.2 mm (length of electrode: 240 mm, distance between electrodes: 1.5 mm).

(6-4) Production of Polarizer Plate

The polarizer was bonded to the surface of the antireflective film (2A) subjected to the surface treatment through an acrylic adhesive (DP-8005 Clear manufactured by Sumitomo 3M), and the surface of the transparent film (3) subjected to the surface treatment was bonded to the other surface of the polarizer through an acrylic adhesive (DP-8005 Clear manufactured by Sumitomo 3M) to obtain a polarizer plate (4A).

(6-5) Installation of Polarizer Plate in Liquid Crystal Panel

A polarizer plate and a viewing angle compensation film provided on either side of a liquid crystal cell were removed from a commercially-available LCD monitor (20 V liquid crystal monitor, TN mode, OCB mode, VA mode, MVA mode, and IPS mode), and the polarizer plate (4A) obtained as described above was bonded to obtain an evaluation monitor.

Examples 7 to 10 and Comparative Examples 3 and 4

Polarizer plates (4B) to (4G) were produced in the same manner as in Example 6 except for using antireflective films (2B) to (2G) instead of the antireflective film (2A). Each of the polarizer plates (4B) to (4G) was bonded to obtain an evaluation monitor.

Tenacity and Surface Hardness Evaluation Test (A) Scratch Visibility Test

The surface hardness of the viewer side of the antireflective film obtained in each of Examples 1 to 5 and Comparative Examples 1 and 2 was measured in accordance with JIS K5600 at a load of 500 g using a pencil with a hardness of 2H. The polarizer plate after measurement was disposed in the liquid crystal monitor, and the display was caused to display a white screen. The screen was diagonally observed at an angle of 45°. A case where pencil scratches were not observed was evaluated as "Good", and a case where pencil scratches were observed was evaluated as "Bad".

(B) Flexibility Evaluation Test

Figure 6:
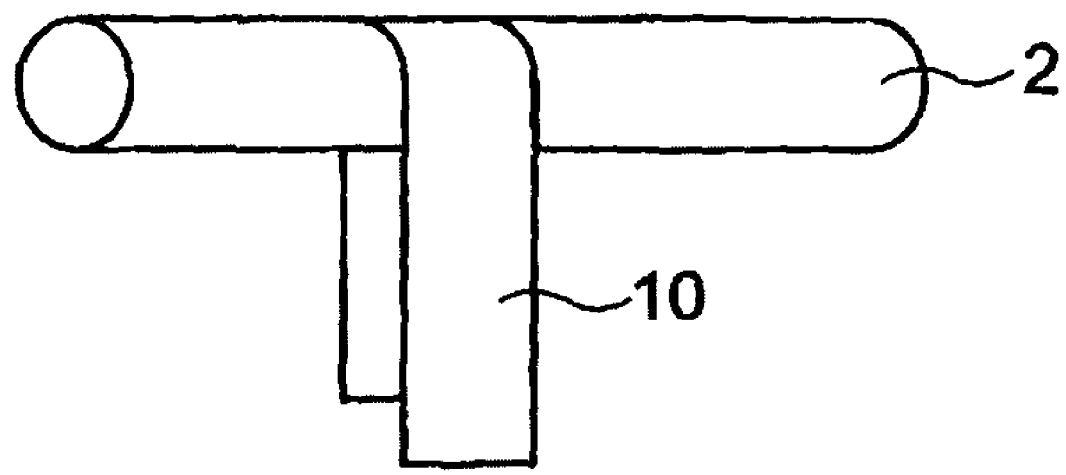
FIG. 6 is a view showing a flexibility evaluation test method.

Each of the antireflective films (2A) to (2G) obtained in Examples 1 to 5 and Comparative Examples 1 and 2 was punched to 1 cm×5 cm to obtain a sample film. As shown in FIG. 6, the resulting sample film (10) was wound around a steel rod (2) with a diameter of 3 mm, and whether or not the wound film (10) broke around the rod (2) was determined. The tests were conducted ten times, and the total number of tests in which the sample film did not break was taken as the flexibility index.

(C) Measurement of Reflectance

The reflectance of each of the antireflective films (2A) to (2G) obtained in Examples 1 to 5 and Comparative Examples 1 and 2 was determined as the reflectance at a wavelength of 550 nm by measuring the reflection spectrum at a specific incident angle using a spectrophotometer.

Table 1 shows the types of resins a and b forming the layer a, the flexural moduli of the layers a and b, the type of adhesive resin forming the adhesive layer (layer x), the layer configuration (thickness), and the WVTR of each of the base resin films (1A) to (1G) obtained in Examples 1 to 5 and Comparative Examples 1 and 2. Table 1 also shows the scratch visibility test evaluation results, the flexibility evaluation test results, and the reflectance measurement results.

b having a relatively low flexural modulus was the base resin layer exhibited excellent results in the scratch visibility test and the flexibility evaluation test. Therefore, it was found that these liquid crystal display devices were provided with a polarizer plate exhibiting high tenacity and high surface hardness. It was also found that the polarizer plate exhibits excellent antireflection performance.

On the other hand, the liquid crystal display device (Comparative Example 3) including the antireflective film in which the transparent film (1F) formed only of PMMA having high surface hardness was the base resin layer exhibited excellent results in the scratch visibility test, but exhibited poor results in the flexibility evaluation test (i.e. the polarizer plate exhibited poor tenacity). The liquid crystal display device (Comparative Example 4) including the polarizer plate in which the transparent film (1G) formed only of NB having low surface hardness was the base resin layer exhibited excellent results in the flexibility evaluation test, but exhibited poor results in the scratch visibility test (i.e. the polarizer plate exhibited low surface hardness).

(D) Liquid Crystal Display Performance Evaluation Test

A liquid crystal display panel was removed from a commercially-available LCD monitor (20 V liquid crystal monitor, TN mode, OCB mode, VA mode, MVA mode, and IPS mode). A polarizer plate and a viewing angle compensation film provided on a liquid crystal cell on the viewer side were removed, and the polarizer plate (3A) to (3G) obtained in each of Examples 6 to 10 and Comparative Examples 3 and 4 was provided on the liquid crystal cell. The liquid crystal display panel was caused to display white characters on a black background. The line of sight was moved from the front in the vertical and horizontal directions, and the angle at which the white characters could not be read was measured.

The measurement results are shown in Table 2.

(E) Color Nonuniformity Evaluation Test

The liquid crystal display device prepared for the liquid crystal display performance evaluation test was cause to dis-

TABLE 1

|  | Example 1 | Example 2 | Example 3 | Example 4 | Example 5 | Comparative Example 1 | Comparative Example 2 |
|---|---|---|---|---|---|---|---|
| Resin a | PMMA | PS | PMMA | PMMA | PMMA | PMMA | NB |
| Flexural modulus of layer a (GPa) | 3.3 | 3.3 | 3.3 | 3.3 | 3.3 | 3.3 | 2.1 |
| Resin b | NB | NB | NB | PC | TAC | None | None |
| Flexural modulus of layer b (GPa) | 2.1 | 2.1 | 2.1 | 2.4 | 2.4 | — | — |
| Adhesive layer (layer x) | EVA1 | EVA1 | EVA1 | EVA1 | EVA2 | None | None |
| Layer configuration (μm) | a/x/b/x/a 20/4/32/4/20 | a/x/b/x/a 20/4/52/4/20 | a/x/b 30/4/66 | a/x/b/x/a 20/4/32/4/20 | a/x/b/x/a 20/3/40/3/20 | a 100 | a 100 |
| Transparent film | 1A | 1B | 1C | 1D | 1E | 1F | 1G |
| WVTR of transparent film (g/day · m$^2$) | 4.0 | 3.5 | 3.2 | 6.0 | 9.0 | 14.0 | 1.5 |
| Antireflective film | 2A | 2B | 2C | 2D | 2E | 2F | 2G |

|  | Example 6 | Example 7 | Example 8 | Example 9 | Example 10 | Comparative Example 3 | Comparative Example 4 |
|---|---|---|---|---|---|---|---|
| Polarizer plate | 3A | 3B | 3C | 3D | 3E | 3F | 3G |
| Scratch visibility test | Good | Good | Good | Good | Good | Good | Bad |
| Flexibility evaluation test | 10 | 10 | 10 | 10 | 10 | 1 | 10 |
| Reflectance (%) | 1.0 | 0.9 | 1.0 | 1.0 | 0.9 | 1.0 | 0.9 |

As shown in Table 1, the liquid crystal display devices (Examples 6 to 10) including the antireflective film in which the stacked film (transparent films (1A) to (1E)) formed of the layer a having a relatively high flexural modulus and the layer play a black screen and allowed to stand at a temperature of 60° C. and a humidity of 90% for 300 hours. The entire black display screen was observed from the front in a darkroom, and evaluated according to the following criteria.

Good: A uniform black display is formed over the entire screen without leakage of light.

Fair: Color nonuniformity of black display is observed at the top, bottom, right, and left of the frame.

Bad: Leakage of light is observed at the top, bottom, right, and left of the frame.

The evaluation results are shown in Table 2.

(F) Bright Point Evaluation Test

The liquid crystal display device prepared for the liquid crystal display performance evaluation test was caused to display a black screen and allowed to stand at a temperature of 60° C. and a humidity of 90% for 300 hours. The entire display screen was observed from the front in a darkroom, and the number of bright points was counted. The evaluation results are shown in Table 2.

inferior to the liquid crystal display devices obtained using the polarizer plates of the examples in all liquid crystal modes used in the test. The liquid crystal display devices obtained using the polarizer plates of Comparative Examples 1 and 2 showed color nonuniformity and produced bright points after being allowed to stand at a high temperature and a high humidity for a long time (300 hours).

INDUSTRIAL APPLICABILITY

According to the present invention, an antireflective film exhibiting excellent antireflective performance, tenacity, and surface hardness, a polarizer plate using the antireflective film, and a display including the polarizer plate are provided.

TABLE 2

| | Liquid crystal mode | Viewing angle Vertical (°) | Viewing angle Horizontal (°) | Color nonuniformity evaluation | Bright point evaluation (number) |
|---|---|---|---|---|---|
| Example 6 | TN | 55 | 100 | Good | 0 |
| Example 7 | | 60 | 90 | Good | 0 |
| Example 8 | | 55 | 90 | Good | 0 |
| Example 9 | | 55 | 90 | Good | 0 |
| Example 10 | | 55 | 90 | Good | 0 |
| Comparative Example 3 | | 50 | 80 | Fair | 15 |
| Comparative Example 4 | | 50 | 80 | Fair | 25 |
| Example 6 | OCB | 65 | 90 | Good | 0 |
| Example 7 | | 70 | 80 | Good | 0 |
| Example 8 | | 65 | 85 | Good | 0 |
| Example 9 | | 65 | 80 | Good | 0 |
| Example 10 | | 65 | 85 | Good | 0 |
| Comparative Example 3 | | 55 | 70 | Fair | 10 |
| Comparative Example 4 | | 60 | 75 | Fair | 15 |
| Example 6 | VA | 90 | 100 | Good | 0 |
| Example 7 | | 85 | 95 | Good | 0 |
| Example 8 | | 85 | 95 | Good | 0 |
| Example 9 | | 85 | 95 | Good | 0 |
| Example 10 | | 85 | 95 | Good | 0 |
| Comparative Example 3 | | 75 | 85 | Fair | 7 |
| Comparative Example 4 | | 70 | 80 | Fair | 15 |
| Example 6 | MVA | 35 | 120 | Good | 0 |
| Example 7 | | 40 | 110 | Good | 0 |
| Example 8 | | 35 | 120 | Good | 0 |
| Example 9 | | 40 | 120 | Good | 0 |
| Example 10 | | 40 | 120 | Good | 0 |
| Comparative Example 3 | | 25 | 100 | Fair | 20 |
| Comparative Example 4 | | 25 | 100 | Fair | 15 |
| Example 6 | IPS | 60 | 130 | Good | 0 |
| Example 7 | | 65 | 130 | Good | 0 |
| Example 8 | | 60 | 125 | Good | 0 |
| Example 9 | | 60 | 130 | Good | 0 |
| Example 10 | | 60 | 130 | Good | 0 |
| Comparative Example 3 | | 50 | 120 | Fair | 17 |
| Comparative Example 4 | | 50 | 120 | Fair | 12 |

As shown in Table 2, the liquid crystal display devices obtained using the polarizer plates of Examples 6 to 10 exhibited excellent viewing angle characteristics in comparison with the liquid crystal display devices obtained using the polarizer plates of Comparative Examples 3 and 4 irrespective of the liquid crystal mode. Even after being allowed to stand at a high temperature and a high humidity for a long time (300 hours), the liquid crystal display devices obtained using the polarizer plates of Examples 1 to 5 showed a small degree of color nonuniformity and did not produce bright points.

On the other hand, the liquid crystal display devices obtained using the polarizer plates of Comparative Examples 3 and 4 exhibited viewing angle characteristics equal to or

The invention claimed is:

1. An antireflective film comprising at least an antireflective layer and a base resin layer, the base resin layer including at least layers a and b respectively including a thermoplastic resin as a main component, the layer a having a flexural modulus higher than that of the layer b, a difference in flexural modulus between the layers a and b is 0.2 GPa to 2.5 GPa, the layer a having a flexural modulus of 3 GPa or more,
   the layer b having a flexural modulus of 2.1 GPa or more and less than 3 GPa, and
   the layer a being closer to the antireflective layer than the layer b.

2. The antireflective film according to claim 1, wherein the thermoplastic resin forming the layer a is a vinyl aromatic polymer, a polyacrylate polymer, a polymethacrylate polymer, a vinyl alicyclic hydrocarbon polymer, or a hydrogenated product thereof.

3. The antireflective film according to claim 1 or 2, wherein the thermoplastic resin forming the layer b is an alicyclic structure-containing polymer, a cellulose polymer, or a polyester polymer.

4. The antireflective film according to claim 1 or 2, wherein the antireflective layer includes a low-refractive-index layer with a refractive index of 1.40 or less.

5. The antireflective film according to claim 4, wherein the base resin layer is obtained by coextrusion.

6. The antireflective film according to claim 5, wherein the base resin layer contains a UV absorber.

7. A polarizer plate obtained by bonding the antireflective film according to claim 1 or 2 to a polarizer.

8. A display comprising the polarizer plate according to claim 7.

9. An antireflective film comprising at least an antireflective layer and a base resin layer, the base resin layer including at least layers a and b respectively including a thermoplastic resin as a main component, the layer a having a flexural modulus higher than that of the layer b, and the layer a being closer to the antireflective layer than the layer b, wherein a combination (layer a/layer b) of the layers a and b is a vinyl aromatic polymer/alicyclic structure-containing polymer, a polyacrylate polymer/alicyclic structure-containing polymer, or a polymethacrylate polymer/alicyclic structure-containing polymer.

* * * * *